April 22, 1958   M. F. REJDAK   2,831,760
MATERIAL FOR WELDING ALUMINUM AND OTHER METALS
Filed Dec. 20, 1955
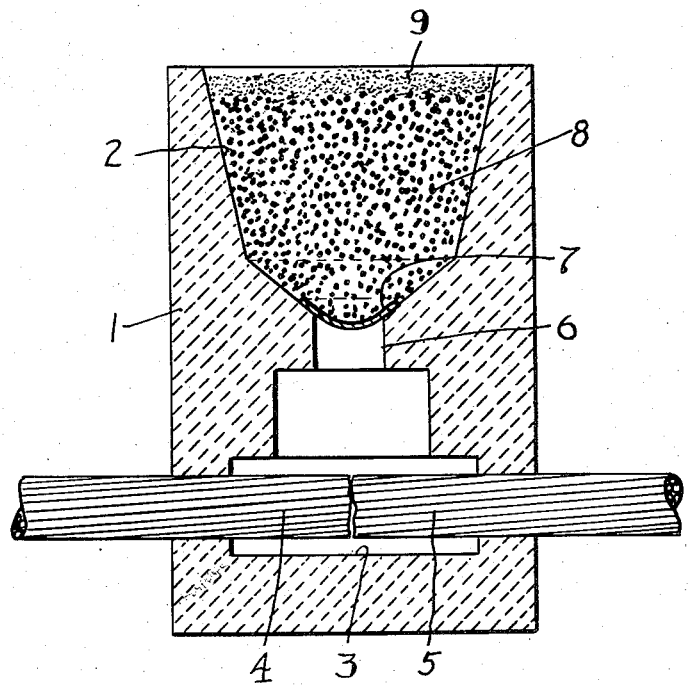
INVENTOR.
MELVIN F. REJDAK
BY
Oberlin + Limbach
ATTORNEYS.

United States Patent Office 2,831,760
Patented Apr. 22, 1958

2,831,760

MATERIAL FOR WELDING ALUMINUM AND OTHER METALS

Melvin F. Rejdak, Cleveland, Ohio, assignor to Erico Products, Inc., Cleveland, Ohio, a corporation of Ohio Application December 20, 1955, Serial No. 554,234

8 Claims. (Cl. 75—27)

This invention relates as indicated to a novel method and material for welding aluminum and other metals, and more particularly to a cast welding operation utilizing molten metal produced by an exothermic reaction.

In Patent No. 2,229,045 to Charles A. Cadwell, there is disclosed a method of welding copper rail bonds to steel rails utilizing highly heated molten copper produced by an exothermic reaction of the Thermit type, and such method has now been in successful commercial use for a number of years on a large scale. Patents 2,277,014 to Noble G. Carlson and 2,654,129 to Edward B. Neff disclose certain preferred forms of cast welding apparatus adapted to be employed with the metal producing exothermic reaction mixture, and in application Serial No. 422,032 of Donald J. Burke for "Welding Apparatus" filed April 9, 1954, there is disclosed another form of apparatus particularly adapted for the joining together of two opposed cable ends by means of a cast weld connection.

For a great many years, copper wire and cable has been accepted as the standard conductor for electric current although certain other metals such as aluminum and silver have been utilized in special applications where their qualities are particularly desirable. In recent years, however, the use of aluminum wire and cable has very greatly increased, and it often becomes necessary to join aluminum cables together or to connect the same to copper bus bars, for example. The molten metal produced by the exothermic reaction mixture disclosed in the aforesaid Cadwell Patent 2,229,045 has not proved satisfactory for the cast welding of aluminum and it has been impossible to obtain a connection which is both physically strong and of substantially unimpaired electrical conductivity until the development of the new process described and claimed in my prior co-pending application Serial No. 503,569, filed April 25, 1955.

A principal object of the present invention is to provide a further improvement in a method and material for cast welding aluminum articles, and more especially for cast welding aluminum conductors such as cable to other cable, bus bars, grounds, etc., such improved process and material providing a cast weld metal having improved hot strength and wetting ability.

Another object is to provide such process and material which will afford a cast weld juncture in which the formation of cracks on cooling is substantially eliminated.

Still another object is to provide such method of welding which is not hindered by the usual oxide film found on articles of aluminum.

A further object is to provide such material and method of welding utilizing an exothermic reaction mixture to produce the molten weld metal in situ at the proper temperature and under properly controlled conditions.

A still further object is to provide a cast welded connection wherein the weld metal is interfused with the aluminum article or articles.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Said annexed drawing is a semi-diagrammatic cross-section through a graphite crucible and associated mold cavity adapted to receive two opposed cable ends to be cast welded together.

Referring now more particularly to such drawing, the welding apparatus may comprise two graphite blocks such as 1 hollowed out to provide an upper crucible portion 2 and mold cavity portion 3, the two halves being temporarily clamped together as shown and described in Burke application Serial No. 422,032, for example. Two dry and clean cable end portions 4 and 5 are clamped in the mold cavity with their opposed ends located substantially vertically below sprue 6 which is closed by means of a small metal disc 7, ordinarily steel. The exothermic reaction mixture which may be supplied in the form of a cartridge is emptied into the crucible so that the principal metal forming materials 8 fill the lower portion of the crucible and the starting powder 9 forms a layer on top. Such starting powder may then be ignited with a flint gun, and it in turn ignites the exothermic reaction mixture to produce the molten metal charge which melts through disc 7 and drops into mold cavity 3, surrounding the cable end portions and bonding thereto. The mold may then be opened and the welded connection removed.

As previously indicated, it has proven extremely difficult to obtain a satisfactory weld where aluminum articles are concerned, as for example when attempting to weld aluminum cable to a copper bus bar. Not only does the aluminum conduct away heat with great rapidity, but also the thin film of aluminum oxide normally covering its surface is highly refractory in character and militates against the obtaining of a true weld in which the metal of the aluminum article is intimately interfused with the weld metal. I have found that a satisfactory weld, and more particularly a weld of good physical strength and electrical conductivity, may be obtained by the employment of molten tin or tin alloy as the weld metal which is so highly heated that it is effective to melt a portion of the aluminum (including aluminum alloy) article while covering such melted portion and preventing contact with the atmosphere. The thin refractory aluminum oxide film is thus locally flushed away and true interfusion of the underlying aluminum with the weld metal is obtained.

I have further discovered that such weld metal may desirably be produced by an exothermic reaction between stannic or stannous oxide and sufficient aluminum to reduce such oxide, sufficient additional metal being present in the reaction mixture to control the violence of the reaction and to form an alloy with the tin metal produced thereby of proper strength, malleability and electrical conductivity.

I have also discovered that certain selected fluxing agents when incorporated in the exothermic reaction mixture greatly facilitate proper carrying out of the operation.

Ordinarily, not only is aluminum the preferred reducing agent for the tin oxide, but also an excess of aluminum metal should be included in the reaction mixture to regulate the reaction and alloy with the molten tin produced thereby. I have further found that by inclusion of copper in the exothermic reaction mixture either as copper metal or in the form of oxide to be reduced by a portion of the aluminum, an improved alloy is produced having much increased hot strength and wetting ability as well as forming a cast weld juncture with a greatly reduced tendency to form cracks on cooling. The copper may be added in the form of metallic copper powder, as cuprous oxide, cupric oxide or as a copper-aluminum alloy.

The basic reaction using stannic oxide, cuprous oxide and aluminum may be written as follows:

$$3SnO_2 + 3Cu_2O + 6Al \rightarrow 3Sn + 6Cu + 3Al_2O_3$$

A preferred formulation may be stated by parts by weight:

37 parts $SnO_2$ + 8 parts $Cu_2O$ + 10 parts Al $\rightarrow$
29 parts Sn + 7 parts Cu Using stannous oxide, cuprous oxide, and aluminum, the reaction may be written:

$$3SnO + 3Cu_2O + 4Al \rightarrow 3Sn + 6Cu + 2Al_2O_3$$

or stated by parts by weight:

32 parts SnO + 8 parts $Cu_2O$ + 5 parts Al $\rightarrow$
28 parts Sn + 7 parts Cu A similar basic reaction occurs when cupric oxide is used with either stannous or stannic oxides. With stannic oxide:

$$3SnO_2 + 3CuO + 6Al \rightarrow 3Sn + 3Cu + 3Al_2O_3$$

or 37 parts $SnO_2$ + 4 parts CuO + 10 parts Al $\rightarrow$
29 parts Sn + 3 parts Cu With stannous oxide:

$$3SnO + 3CuO + 4Al \rightarrow 3Sn + 3Cu + 2Al_2O_3$$

or 32 parts SnO + 4 parts CuO + 5 parts Al $\rightarrow$
28 parts Sn + 3 parts Cu The metallic tin produced by any of the foregoing reactions is extremely highly heated, but the reaction unless regulated as described below is so violent and spatters the reaction mixture so exceedingly that it is not practical. I accordingly moderate the reaction by incorporating in the reaction mixture an excess of from 8 to 40 parts of aluminum powder based on the parts formulas given above. An excess of 30 parts aluminum powder yields the best results. If the copper is added to the exothermic reaction mixture as metallic copper powder or alloyed with all or a portion of the aluminum, the quantity of excess aluminum required to moderate the reaction may be somewhat reduced. Preferably the particle size of the various components of the mixture should range between 200 and 325 mesh.

From about 2% to about 25% copper should be present in the resultant cast weld metal, with 9% copper being preferred. The excess aluminum in the reaction mixture not only serves to moderate, regulate and control the otherwise too violent exothermic reaction, but also alloys with the molten metallic tin produced, together with the molten copper, to form a highly heated molten alloy capable when dropped into the mold cavity of interfusing with the aluminum cable end portions to form a strong malleable cast weld. The temperature of such molten charge will preferably be in excess of 2,000° F. and the cast weld metal is accordingly enabled actually to melt portions of the cable and wash away the refractory oxide film thereon to form an integral weld. The aluminum cable or other aluminum article may also be cast welded by my new process to articles of brass, bronze, and Nichrome. In these cases, both the aluminum article and the other article are interfused with the cast weld metal. Copper, steel, stainless steel and cast iron articles may also be bonded to aluminum articles in accordance with my invention if properly prepared, as by dipping in molten tin, so that the cast weld metal will braze thereto.

By far the preferred fluxing agent which may be included in the exothermic reaction powder mixture is calcium fluoride. If desired, a proportion of cryolite or sodium chloride may be included therewith.

The following examples of suitable exothermic reaction powder formulations for welding aluminum in accordance with my invention are given by way of illustration only and are not to be considered as limiting the invention. They are arranged in order of preference and the percentages given are by weight. In each case aluminum powder is employed as the oxide reducing agent and also as the excess metal for the purpose of regulating the reaction and obtaining a welding alloy of desired composition:

*Example 1*

| | Percent |
|---|---|
| Tin oxide | 46.8 |
| Aluminum powder | 42.2 |
| Cuprous oxide | 7.3 |
| Calcium fluoride | 3.7 |

*Example 2*

| | |
|---|---|
| Tin oxide | 45.2 |
| Aluminum powder | 41.8 |
| Cupric oxide | 9.5 |
| Calcium fluoride | 3.5 |

*Example 3*

| | |
|---|---|
| Tin oxide | 52.4 |
| Aluminum powder | 36.1 |
| Copper powder | 7.5 |
| Calcium fluoride | 4.0 |

*Example 4*

| | |
|---|---|
| Tin oxide | 52.4 |
| Aluminum powder | 28.6 |
| 50/50 Cu-Al alloy | 15.0 |
| Calcium fluoride | 4.0 |

*Example 5*

| | |
|---|---|
| Tin oxide | 49.1 |
| Aluminum powder | 43.3 |
| Cuprous oxide | 3.8 |
| Calcium fluoride | 3.8 |

*Example 6*

| | |
|---|---|
| Tin oxide | 43.4 |
| Aluminum powder | 39.3 |
| Cuprous oxide | 13.8 |
| Calcium fluoride | 3.5 |

*Example 7*

| | |
|---|---|
| Tin oxide | 40.4 |
| Aluminum powder | 36.5 |
| Cuprous oxide | 19.8 |
| Calcium fluoride | 3.3 |

The ranges of ingredients permissible in the usual formulation are indicated below, it being understood that there must always be sufficient aluminum to reduce the oxides present:

| | |
|---|---|
| Tin oxide | From 51.1% to 35.4%. |
| Aluminum powder | From 43.3% to 36.5%. |
| Cuprous oxide | From 1.8% to 24.8%. |
| Calcium fluoride | From 3.8% to 3.3%. |

As previously indicated, certain other metals may be included in the exothermic reaction mixture for the purpose of regulating the same instead of the excess aluminum provided in the examples given above. In general, an amount of aluminum powder will be included slightly more than the theoretical amount required to reduce the tin oxide present (and also the copper oxide, if present) and then approximately 20% by weight of nickel, tin, silver, iron, or chromium may be included instead of the excess aluminum. Illustrative examples of exothermic reaction mixture formulations in accordance with my invention in which a metal other than aluminum is utilized to control the reaction and to alloy with the molten tin and copper are given below:

Example 8

| | Percent |
|---|---|
| Tin oxide | 54.8 |
| Aluminum powder | 14.4 |
| Silver | 19.3 |
| Cuprous oxide | 7.1 |
| Calcium fluoride | 4.4 |

Example 9

| | Percent |
|---|---|
| Tin oxide | 55.8 |
| Aluminum powder | 14.3 |
| Nickel | 18.2 |
| Cuprous oxide | 7.1 |
| Calcium fluoride | 4.6 |

Example 10

| | Percent |
|---|---|
| Tin oxide | 55.8 |
| Aluminum powder | 14.6 |
| Iron | 16.6 |
| Cuprous oxide | 7.1 |
| Calcium fluoride | 5.9 |

Example 11

| | Percent |
|---|---|
| Tin oxide | 53.9 |
| Aluminum powder | 14.1 |
| Tin | 20.4 |
| Cuprous oxide | 7.1 |
| Calcium fluoride | 4.5 |

Example 12

| | Percent |
|---|---|
| Tin oxide | 56.9 |
| Aluminum powder | 14.4 |
| Chromium | 17.6 |
| Cuprous oxide | 7.1 |
| Calcium fluoride | 4.0 |

Stannic oxide is commercially available in particle sizes of from about 0.5 to about 1.5 microns, and such material has proven very satisfactory for my purpose although somewhat larger size particles are also suitable. A suitable particle size for the aluminum powder and other metals present in the reaction mixture is approximately 325 mesh. It will be appreciated that the excess metals employed for the purpose of regulating the reaction may include one or more of the several metals indicated above as suitable for this purpose. The principal requirement is that they shall not be volatilized by the heat of the reaction and will alloy with the molten tin to form a strong malleable cast weld of good electrical conductivity.

A suitable ignition powder formulation is as follows:

| | Percent |
|---|---|
| Fine (red) copper oxide | 36.11 |
| Black copper oxide | 30.56 |
| Fine aluminum alloy (60% Cu, 40% Al) | 16.66 |
| Fine aluminum powder | 8.33 |
| Red phosphorus | 8.33 |

Various other suitable ignition mixtures are well known in the art. They may themselves be ignited in various ways, the safest and most satisfactory being through use of a flint gun.

In general, other reducing agents known and employed in various prior art Thermit reactions are not nearly as satisfactory as aluminum, some of them producing reactions even more difficult to control and forming less satisfactory alloys with the metal tin. Consequently, aluminum is by far the preferred reducing agent.

The preferred alloying metals indicated above have relatively high boiling points, high latent heats of fusion and are capable of alloying with the tin to form malleable cast welds with good electrical conductivity. The alloying metals should have boiling points not lower than 3500° F. The most suitable alloying metals listed above have boiling points as follows:

| | °F. |
|---|---|
| Silver | 4010 |
| Nickel | 4950 |
| Iron | 4960 |
| Tin | 4120 |
| Chromium | 4500 |
| Aluminum | 3740 |

Aluminum has a melting point of 1220° F. and tin has a melting point of 449° F. The alloys produced by reaction of the exothermic reaction mixtures listed above all have melting points below 2000° F.

It will be seen from the foregoing that I have provided a novel exothermic reaction mixture which permits me to weld an aluminum article to another metal article by igniting such exothermic reaction mixture to produce highly heated molten copper alloy of tin having a temperature in excess of 2000° F., such molten metal immediately being delivered to a mold cavity defined in part by such articles to be joined, the heat content of such molten charge causing a portion of the aluminum article to interfuse therewith to form a strong malleable connection. In certain cases, the heat of such molten charge may be as high as 3000° F.

Stannous oxide, while also suitable for use in the reaction, is too expensive for ordinary commercial use. The molten metal produced by my exothermic reaction will ordinarily and preferably comprise a major proportion of tin by weight. Where the term "tin oxide" is used herein, stannic oxide is intended, and percentages and parts given are by weight.

It is usually desirable, and when welding aluminum cable and the like it may be quite important, to apply a suitable flux to the parts to be welded capable of dissolving the aluminum oxide coating when heated. A good practice is first to degrease the articles with an appropriate solvent and then swab a concentrated water solution thereon having the following composition:

(1)

| | Parts by weight |
|---|---|
| Sodium chloride | 20 |
| Potassium chloride | 20 |
| Water | 100 |

This coating is dried completely prior to performance of the welding operation, leaving a flux incrustation on the articles. Other suitable fluxes for my purpose include:

(2)

| | Parts by weight |
|---|---|
| Lithium chloride | 20 |
| Sodium chloride | 10 |
| Potassium chloride | 10 |
| Zinc chloride | 10 |
| Water | 100 |

(3)

| | Parts by weight |
|---|---|
| Lithium chloride | 9 |
| Lithium fluoride | 5 |
| Sodium chloride | 30 |
| Potassium chloride | 40 |
| Zinc chloride | 10 |
| Water | 50 |

The use of fluxes when welding aluminum is, of course, well known in the art.

Other modes of applying the principle of the invention may be employed, change being made as regards the details described, provided the features stated in any of the following claims or the equivalent of such be employed.

I therefore particularly point out and distinctly claim as my invention:

1. An exothermic reaction mixture for the production of highly heated molten weld metal comprising 37 parts by weight of stannic oxide, 4 parts by weight of cuprous oxide, and from 18 to 50 parts by weight of metallic aluminum powder.

2. An exothermic reaction mixture for the production of highly heated molten weld metal comprising 37 parts by weight of stannic oxide having a particle size of from about 0.5 to about 1.5 microns, 4 parts by weight of cuprous oxide, and approximately 30 parts by weight of metallic aluminum powder, said cuprous oxide and aluminum powder having a particle size on the order of 325 mesh.

3. An exothermic reaction mixture for the production of highly heated molten weld metal comprising

| | Percent by weight |
|---|---|
| Stannic oxide | 46.8 |
| Aluminum powder | 42.2 |
| Cuprous oxide | 7.3 |
| Calcium fluoride | 3.7 |

4. An exothermic reaction mixture for the production of highly heated molten weld metal comprising a major proportion of stannic oxide by weight, sufficient aluminum powder to reduce said oxide, approximately 9% copper as metal by weight, and an amount of an alloying metal selected from the class consisting of aluminum, nickel, tin, silver, iron, and chromium sufficient to regulate the exothermic reaction to prevent violent spattering and to reduce the temperature of the resultant molten alloy to a figure not less than 2,000° F.

5. The reaction mixture of claim 4, including a small amount of calcium fluoride as a fluxing agent.

6. An exothermic reaction mixture for the production of highly heated molten weld metal comprising 37 parts by weight of stannic oxide, 4 parts by weight of cuprous oxide, from 18 to 50 parts by weight of metallic aluminum powder, and a small amount of calcium fluoride as a fluxing agent.

7. An exothermic reaction mixture for the production of highly heated molten weld metal comprising tin oxide, copper oxide, a reducing agent effective to reduce said oxides to produce a molten alloy of tin and copper and sufficient metal powder selected from the class consisting of tin, aluminum, nickel, silver, iron and chromium to regulate the reaction to prevent violent spattering and substantial loss of such molten alloy and to reduce the temperature of the final molten alloy to a figure not less than 2,000° F., the tin comprising a major proportion of such final alloy.

8. An exothermic reaction mixture for the production of highly heated molten weld metal comprising tin oxide, copper oxide, a reducing agent effective to reduce said oxides to produce a molten alloy of tin and copper and sufficient metal powder selected from the class consisting of tin, aluminum, nickel, silver, iron and chromium to regulate the reaction to prevent violent spattering and substantial loss of such molten alloy and to reduce the temperature of the final molten alloy to a figure not less than 2,000° F., the tin comprising a major proportion of such final alloy and the copper comprising from 2% to 25% by weight of such final alloy.

References Cited in the file of this patent

UNITED STATES PATENTS

| | | |
|---|---|---|
| 587,303 | Ellis | Aug. 3, 1897 |
| 1,007,734 | Rocky | Nov. 7, 1911 |
| 1,196,744 | Chubb | Aug. 29, 1916 |
| 1,556,402 | Begtrup | Oct. 6, 1925 |
| 1,562,227 | Goldschmidt | Nov. 17, 1925 |
| 1,637,033 | Basch | July 26, 1927 |
| 2,229,045 | Cadwell | Jan. 21, 1941 |
| 2,280,873 | Udy | Apr. 28, 1942 |
| 2,355,627 | Cadwell | Aug. 15, 1944 |